United States Patent Office.

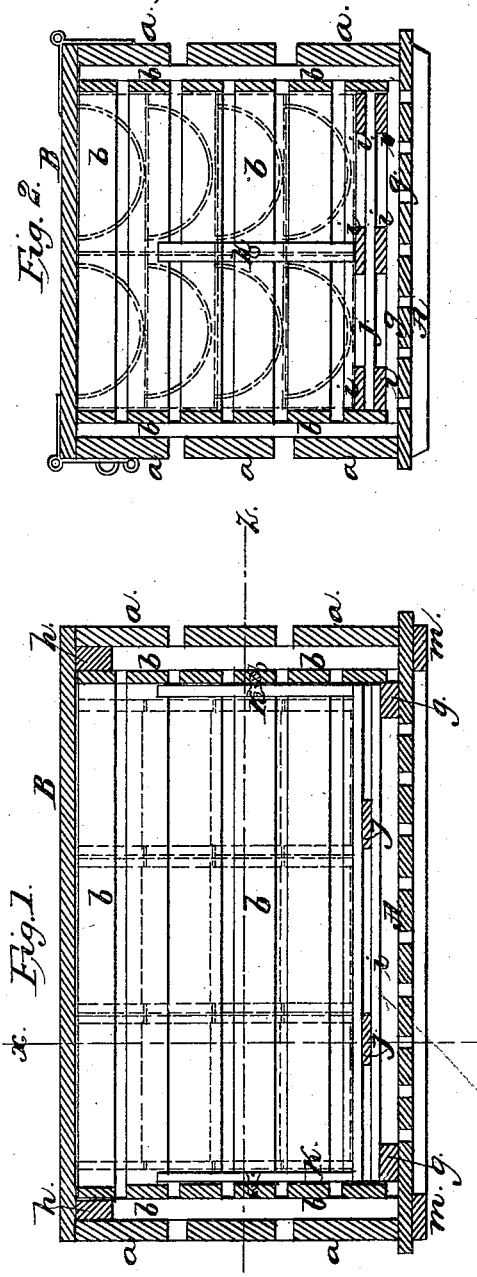

TRUMAN MABBETT, SR., OF VINELAND, NEW JERSEY.

Letters Patent No. 77,060, dated April 21, 1868.

IMPROVED FRUIT-CRATE.

*The Schedule referred to in these Letters Patent and making part of the same.*

TO ALL WHOM IT MAY CONCERN:

Be it known that I, TRUMAN MABBETT, Sr., of Vineland, in the county of Cumberland, and State of New Jersey, have invented new and useful Improvements in Fruit-Crates; and I do hereby declare that the following is a full, clear, and exact description thereof, which will enable those skilled in the art to make and use the same, reference being had to the accompanying drawings, forming part of this specification, in which—

Figure 1 is a transverse vertical section of my improved fruit-crate through the line $y\,y$ of fig. 3.

Figure 2 is a cross-section of the same through the line $x\,x$ of fig. 1.

Figure 3 is a horizontal section of the same through line $z\,z$ of fig. 1.

Similar letters of reference indicate corresponding parts.

The nature of this invention relates to the packing of fruit for transportation; and consists of a crate composed of slats, with spaces between each slat, said crate also containing an inner or lining crate, together with a spring-bottom and other devices, perfecting the whole, as will hereinafter be more fully set forth.

The horizontal slats or boards, $a\,a\,a$, &c., of the outer crate are nailed to corner uprights, $d\,d\,d\,d$, as shown, and the similar horizontal slats, $b\,b\,b$, &c., of the inner crate are nailed to the uprights $b$, and similar and adjacent uprights $e$, as shown, the ends of the end slats of the inner crate being placed in contact with and between the uprights $d$ and $e$ at each corner, as shown. Thus the said uprights conduce to the formation of both crates.

The bottom, A, is a part of the outer crate, and is perforated for ventilation, as shown. The lid, B, is hinged to the outer crate, and serves as a lid for both crates.

The spring-bottom is composed of springy battens $i\,i\,i$ and $j\,j$, the cross-battens, $j\,j$, being nailed between the longitudinal battens, $i\,i\,i$, above and below, as shown.

The ends of the longitudinal battens project beyond the cross-battens, as shown, and the ends of the lower longitudinal battens rest upon the cross-pieces, $g\,g$, on the bottom, A, of the large crate, and the battens are thereby permitted space to yield downwards, as well as to insure better ventilation.

The construction of the spring-bottom permits it to yield downward at any point, by the compound action of any two or more battens, as will be perceived.

Two buttons, $k\,k$, serve to keep the bottom in place, and are turned horizontally when the bottom is to be removed.

The whole crate rests upon cross-bars $m\,m$, nailed to the outside of the bottom, A, as shown.

These bars serve to raise the crate from the floor or ground for the purpose of ventilating the contents.

This crate is designed more particularly for the transportation of berries, which are placed in small boxes, and these latter are set in tiers and courses within the crate, until it is filled.

The red outline shows the manner of locating such boxes.

The curved dotted lines indicate the bottoms of a kind of fruit-box to be packed in crates, and which has been already patented by my son, Truman Mabbett, Jr.

In practice more of such boxes would be contained in a crate than are indicated in the drawing.

By my improved crate, as above set forth, a large quantity of any kind of berries, as strawberries, (which are the most delicate,) may be transported in wagons or by rail, and not be damaged by the heat, or the rough handling to which freight is commonly subjected.

I also contemplate a modification of the spring-bottom, by employing metal or rubber springs between the said spring-bottom and the bottom of the outer crate.

The crate is cheap and durable, and will be appreciated by those interested in the culture of berries for market.

I claim as new, and desire to secure by Letters Patent—

1. A double crate, composed of the slats $a\,a\,a$ and $b\,b\,b$, corner uprights $d\,e$, perforated bottom A, all substantially as shown and described and for the purpose set forth.

2. The spring-bottom, substantially as shown and described, in combination with the double crate, all as and for the purpose set forth.

TRUMAN MABBETT, SR.

Witnesses:
SARAH LOUISE HEYWOOD,
THEODORE WILES.